United States Patent
Myasnikov et al.

(10) Patent No.: US 6,708,546 B2
(45) Date of Patent: Mar. 23, 2004

(54) HONEYCOMB HYDROGEN STORAGE STRUCTURE WITH RESTRICTIVE NECK

(75) Inventors: Vitaliy Myasnikov, West Bloomfield, MI (US); Baoquan Huang, Troy, MI (US); Rosa Young, Bloomfield Hills, MI (US); Stanford R. Ovshinsky, Bloomfield Hills, MI (US)

(73) Assignee: Texaco Ovonic Hydrogen Systems LLC, Rochester Hills, MI (US)

( * ) Notice: Subject to any disclaimer, the term of this patent is extended or adjusted under 35 U.S.C. 154(b) by 3 days.

(21) Appl. No.: 10/173,381

(22) Filed: Jun. 17, 2002

(65) Prior Publication Data

US 2003/0209148 A1 Nov. 13, 2003

Related U.S. Application Data

(63) Continuation-in-part of application No. 10/143,243, filed on May 9, 2002.

(51) Int. Cl.$^7$ .............................................. F17C 11/00
(52) U.S. Cl. ........................... 72/121; 206/0.7; 96/126; 96/146; 96/154
(58) Field of Search ............................. 423/248, 648.1; 420/900; 206/0.7; 502/526; 72/121; 96/108, 121, 131, 126, 146, 154

(56) References Cited

U.S. PATENT DOCUMENTS

| | | | | |
|---|---|---|---|---|
| 4,061,009 A | * | 12/1977 | Kaporovich et al. | 72/69 |
| 4,165,569 A | * | 8/1979 | Mackay | 34/416 |
| 4,318,491 A | * | 3/1982 | Nelson et al. | 220/566 |
| 4,457,136 A | * | 7/1984 | Nishizaki et al. | 62/46.2 |
| 4,609,038 A | * | 9/1986 | Ishikawa et al. | 165/104.12 |
| 4,905,856 A | * | 3/1990 | Krogager | 220/588 |
| 4,945,010 A | * | 7/1990 | Kaufman et al. | 429/26 |
| 6,015,041 A | * | 1/2000 | Heung | 206/70 |
| 2002/0100369 A1 | * | 8/2002 | Kuriiwa et al. | 96/146 |

FOREIGN PATENT DOCUMENTS

| | | | |
|---|---|---|---|
| JP | 62-288495 A | * | 12/1987 |
| JP | 63-35401 A | * | 2/1988 |
| JP | 63-76997 A | * | 4/1988 |
| JP | 5-106792 A | * | 4/1993 |

* cited by examiner

*Primary Examiner*—Frank M. Lawrence
(74) *Attorney, Agent, or Firm*—Frederick W. Mai II; David W. Schumaker; Marvin S. Siskind

(57) ABSTRACT

Heat transfer management/compartmentalization system for a metal hydride hydrogen storage containment unit. The hydrogen storage alloy is preferably divided into compartments having a honeycomb configuration. Heat exchanger tubing is placed through the compartments to promote heat transfer between the hydrogen storage alloy and the exterior environment.

4 Claims, 4 Drawing Sheets

US 6,708,546 B2

HONEYCOMB HYDROGEN STORAGE STRUCTURE WITH RESTRICTIVE NECK

RELATED APPLICATIONS

The present invention is a continuation-in-part of co-pending U.S. patent application Ser. No. 10/143,243, which is assigned to the same assignee as the current application, entitled "A Honeycomb Hydrogen Storage Structure", filed May 9, 2002, the disclosure of which is hereby incorporated by reference.

FIELD OF THE INVENTION

The present invention relates to a hydrogen storage unit using hydrideable metal alloys to store hydrogen, and more particularly to a hydrogen storage unit having compartmentalization and a heat transfer system within such unit.

BACKGROUND

In the past considerable attention has been given to the use of hydrogen as a fuel or fuel supplement. While the world's oil reserves are rapidly being depleted, the supply of hydrogen remains virtually unlimited. Hydrogen can be produced from coal, natural gas and other hydrocarbons, or formed by the electrolysis of water. Moreover hydrogen can be produced without the use of fossil fuels, such as by the electrolysis of water using renewable energy. Furthermore, hydrogen, although presently more expensive than petroleum, is a relatively low cost fuel. Hydrogen has the highest density of energy per unit weight of any chemical fuel and is essentially non-polluting since the main by-product of burning hydrogen is water.

While hydrogen has wide potential application as a fuel, a major drawback in its utilization, especially in mobile uses such as the powering of vehicles, has been the lack of acceptable hydrogen storage medium. Conventionally, hydrogen has been stored in a pressure vessel under a high pressure or stored as a cryogenic liquid, being cooled to an extremely low temperature. Storage of hydrogen as a compressed gas involves the use of large and bulky vessels.

Additionally, transfer is very difficult, since the hydrogen is stored in a large-sized vessel; amount of hydrogen stored in a vessel is limited, due to low density of hydrogen. Furthermore, storage as a liquid presents a serious safety problem when used as a fuel for motor vehicles since hydrogen is extremely flammable. Liquid hydrogen also must be kept extremely cold, below –253 degrees C., and is highly volatile if spilled. Moreover, liquid hydrogen is expensive to produce and the energy necessary for the liquefaction process is a major fraction of the energy that can be generated by burning the hydrogen.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. Solid-phase metal or alloy system can store large amounts of hydrogen by absorbing hydrogen with a high density and by forming a metal hydride under a specific temperature/pressure or electrochemical conditions, and hydrogen can be released by changing these conditions. Metal hydride systems have the advantage of high-density hydrogen-storage for long periods of time, since they are formed by the insertion of hydrogen atoms to the crystal lattice of a metal. A desirable hydrogen storage material must have a high gravimetric and volumetric density, a suitable desorption temperature/pressure, good kinetics, good reversibility, resistance to poisoning by contaminants including those present in the hydrogen gas and be of a relatively low cost. If the material fails to possess any one of these characteristics it will not be acceptable for wide scale commercial utilization.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to contaminants to which the material may be subjected during manufacturing and utilization is required to prevent a degradation of acceptable performance.

Many metal alloys are recognized as having suitability for hydrogen storage in their atomic and crystalline structures as hydride materials. While this storage method holds promise to be ultimately convenient and safe; improvements in efficiency and safety are always welcome. This invention provides such improvement.

It is known that heat transfer capability can enhance or inhibit efficient exchange of hydrogen into and out of metal alloys useful in hydride storage systems, because during hydriding an exothermic reaction occurs and during dehydriding an endothermic reaction occurs. Such transfer is important since metal hydrides, in their hydrided state, being somewhat analogous to metal oxides, borides, and nitrides ("ceramics") may be considered to be generally insulating materials. Therefore, moving heat within such systems or maintaining preferred temperature profiles across and through volumes of such storage materials becomes a crucial factor in metal alloy-metal hydride hydrogen storage systems. As a general matter, release of hydrogen from the crystal structure of a metal hydride requires input of some level of energy, normally heat. Placement of hydrogen within the crystal structure of a metal, metal alloy, or other storage system generally releases energy, normally heat, providing a highly exothermic reaction of hydriding or placing hydrogen atoms within the crystal structure of the hydrideable alloy.

The heat released from hydrogenation of hydrogen storage alloys must be removed. Heat ineffectively removed can cause the hydriding process to slow down or terminate. This becomes a serious problem which prevents fast charging. During fast charging, the hydrogen storage alloy is quickly hydrogenated and considerable amounts of heat are produced. The present invention provides for effective removal of the heat caused by the hydrogenation of the hydrogen storage alloys to facilitate fast charging of the hydride material.

In light of the heat input and heat dissipation needs of such systems, particularly in bulk, and in consideration of the insulating nature of the hydrided material, it is useful to provide means of heat transfer external to the storage material itself. Others have approached this in different ways, one by inclusion of a metal-bristled brush or brush-like structure within the hydrogen storage alloy, depending upon the metal bristles to serve as pathways for effective heat transfer. Another has developed a heat-conductive reticulated open-celled "foam" into which the hydrided or hydrideable material is placed. The current invention provides for effective heat transfer throughout a hydrogen storage bed via a compartmentalization scheme using thermally conductive material.

Another recognized difficulty with hydride storage materials is that as the storage alloy is hydrided, it will generally expand and the particles of storage material will swell and, often crack. When hydrogen is released, generally on application heat, the storage material or hydrided material will shrink and some particles may collapse. The net effect of the cycle of repeated expansion and contraction of the storage material is comminution of the alloy or hydrided alloy particles into successively finer grains. While this process may be generally beneficial to the enhancement of overall surface area of the alloy or storage material surface area, it creates the possibility that the extremely fine particles may sift through the bulk material and settle toward the lower regions of their container and pack more tightly than is desirable. The highly packed localized high density region may produce a great amount of strain on the vessel due to the densification and expansion (upon charging) of the hydrogen storage material. The densification and expansion of the hydrogen storage material provide the possibility of deformation, cracking, or rupture of the container in which the hydrideable material is stored. While pressure relief devices may be useful in preventing such undesired occurrences as the container rupture due to the internal gas pressure of the vessel, pressure relief devices are unable to prevent deformation of the vessel resulting from densification and expansion of the hydrogen storage alloy. Others have approached the problem by dividing the container into simple compartments in a manner that prevents collection of too many fines in a particular compartment while allowing free flow of hydrogen gas throughout the container. The current invention provides for uniform powder packaging in compartments thereby minimizing the collection of particulate hydride fines which cause the difficulties noted earlier while providing for thermal heat transfer between the hydrogen storage material and the exterior environment.

SUMMARY OF THE INVENTION

The present invention discloses a hydrogen storage apparatus utilizing compartmentalization and heat transfer within the apparatus and providing heat transfer between the apparatus and the exterior environment. The hydrogen storage apparatus provides a rechargeable container to store and release hydrogen. The container may be a pressure containment vessel with an aluminum or aluminum alloy composition. A hydrogen storage alloy, which stores the hydrogen in hydride form is contained inside the vessel. The interior of the vessel is divided into multiple compartments by one or more blocks having a honeycomb configuration. The blocks are formed of a thermally conductive material allowing heat to be transferred between the hydrogen storage alloy and the vessel. A series of heat exchanger tubes adapted to cool or heat said hydrogen storage alloy are inserted through the blocks.

The blocks are composed of a plurality of adjacent cells having a wall, an open top, and an open bottom. The blocks may be disc shaped, polygonal shaped, or have various other shapes provided that the interior of the vessel is divided into a plurality of compartments. The cell walls are shared between the cells in each block. The cells are positioned parallel to the axial direction of the vessel. The cells may have uniform heights and uniform diameters, however, the cells may have unequal heights and unequal diameters when needed to uniformly contact a curved interior surface of the vessel or conform to design requirements. The cells generally have a diameter up to 25 mm, preferably between 3 mm and 12 mm, most preferably between 3 mm and 7 mm. The cells have a circular or polygonal cross section. The cells are comprised of a thermally conductive metal which is able to withstand the operating temperatures and pressures inside the vessel, and has negligible reactivity with the hydrogen and hydrogen storage alloy. The thermally conductive metal is selected from a group consisting of stainless steel, Al, Mg, Cu and alloys, composites, or mixtures thereof.

The blocks may also be comprised of a corrugated material. The corrugated metal is comprised of a thermally conductive metal able to withstand the operating temperatures and pressures inside said vessel having negligible reactivity with said hydrogen storage alloy. The thermally conductive metal is selected from a group consisting of stainless steel, Al, Mg, Cu and alloys, composites, or mixtures thereof.

The heat exchanger tubing extends the entire length of the vessel. The heat exchanger tubing may consist of multiple U-tubes disposed throughout the honeycomb blocks. The cells are configured to conform to the shape of said tubing once said tubing is inserted through said cells. To aid in heat transfer between the cells and the tubing and to aid insertion of the tubing through the cells, the tubing may be coated with thermally conductive agents. The heat exchanger tubes preferably carries water, ethylene glycol or mixtures thereof. The tubing is preferably composed of stainless steel or aluminum.

The vessel is preferably formed around the blocks thereby making the vessel seamless, however, a two piece vessel may be used where the blocks are placed into said vessel and said two pieces are welded together forming a seam in the vessel. The vessel may also be wrapped in fiber reinforced composite material such as glass or carbon fiber to provide additional strength to the vessel.

DETAILED DESCRIPTION OF THE INVENTION

Figure 1:
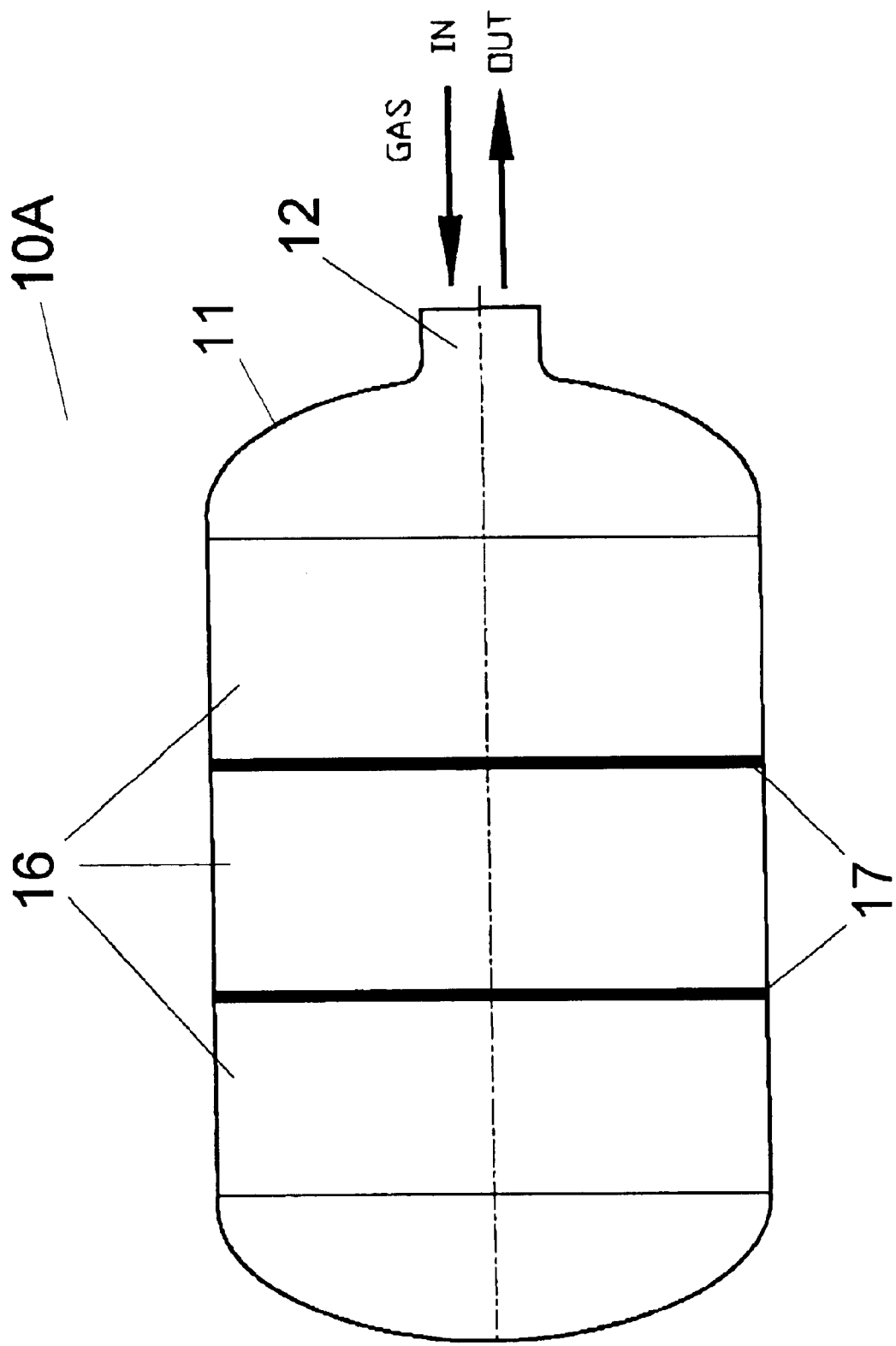
FIG. 1 shows a detailed diagram of the first embodiment of the present invention.

This invention applies compartmentalization of the hydride bed within a pressure containment vessel to reduce hydride fines settlement and packing and improve heat transfer to and from the interior of the hydride bed to the exterior environment. Improvement is made by compartmentalization in a honeycomb configuration to minimize the movement of alloy or hydride fines into accumulations which may cause excessive strain on the vessel due to densification and expansion of the hydrogen storage material. The compartmentalization may be accomplished in numerous ways with the goal being to segregate smaller volumes of the hydrogen storage alloy thereby limiting the travel, and subsequent settling or accumulation, of the fines which can be expected to be generated within the material through normal use with repetitive charge/discharge cycling. This must be accomplished while retaining free gas flow of the stored hydrogen. Tolerances of compartmentalization must be close enough to minimize flow of particulate fines yet maintain gas flow sufficient to meet requirements of devices in gas-flow communication with the hydride bed container such as fuel cells, engines, recharging devices, as well as other users and suppliers of hydrogen from the absorbed hydrogen bed container.

This invention includes not only compartmentalization, but also employs highly heat conductive materials within the hydride bed for enhancement and management of the heat transfer within the system. The low thermal conductivity of the hydrogen storage alloy makes it necessary to enhance the heat transfer through the hydrogen storage alloy. In meeting both the need to prevent material densification and the need for additional heat transfer, the present invention involves creating compartments within the vessel using materials having good heat-transfer characteristics. In this manner, heat transfer to assist in efficient discharging of hydrogen from the storage material and storage bed generally is enhanced and compartmentalization is effectively accomplished. The compartments are formed from multiple cells arranged in a honeycomb configuration. The cells preferably are composed of materials having exceptional thermal conductivity, but in some circumstances low or variable thermal conductivity across the hydride bed will serve beneficially.

The present invention utilizes heat exchanger tubing placed through the compartmentalized hydride bed to add heat needed for endothermic dehydrogenation and remove the excess heat created by the exothermic hydrogenation of the hydrogen storage alloy. The heat exchanger tubing is placed through the compartments while maintaining thermal contact with the walls of the compartments. To achieve the intimate contact with the hydrogen storage compartments, the walls of the compartments may be configured to conform to the shape of the tubes once the tube are inserted through the compartments. Any number of heat exchanger tubes may be used to accomplish the desired result.

The present invention provides for storage of hydrogen within a pressure containment vessel, however a wide variety of vessels or containers may be used in accordance with the present invention. The pressure containment vessel may be cylindrical with a horizontal axis. The vessel may generally be formed of aluminum or stainless steel and alloys thereof. The vessel may be formed around the contents thereby making the vessel seamless. The vessel may also be composed of two sections where the contents are placed into the vessel and the two sections are welded together forming a seam in the vessel. The vessel may have one or more openings designed to allow hydrogen to enter and exit the vessel and allow a continuous cooling/heating stream to flow into and out of the vessel. Preferably, the vessel has an opening at both ends, one for hydrogen and one for the cooling/heating stream. Other configurations of openings in the vessel may be used provided the vessel allows hydrogen to enter and exit the vessel and a continuous heating/cooling stream to flow through tubing within the vessel. Where openings are utilized on both ends of the vessel, a valve is placed on one end to allow the hydrogen to enter or exit the vessel while not allowing any of the hydrogen storage material to exit the vessel with the hydrogen. A valve designed to allow the cooling/heating stream to continuously enter and exit the vessel is placed on the other end. To provide the vessel with additional strength for high pressure operation, a fiber reinforced composite material such as glass or carbon fiber may be wound around the vessel to help prevent vessel rupture at high pressures.

The first embodiment 10A of the present invention is shown in FIG. 1. The hydrogen storage alloy is stored inside one or more honeycomb configured blocks 16 adjacently disposed within the vessel 11. The blocks 16 may have a disc, polygonal, or other configuration provided that the blocks compartmentalize the entire interior of the vessel. The vessel has a restrictive neck 12 through which hydrogen enters and exits the vessel.

Figure 2:
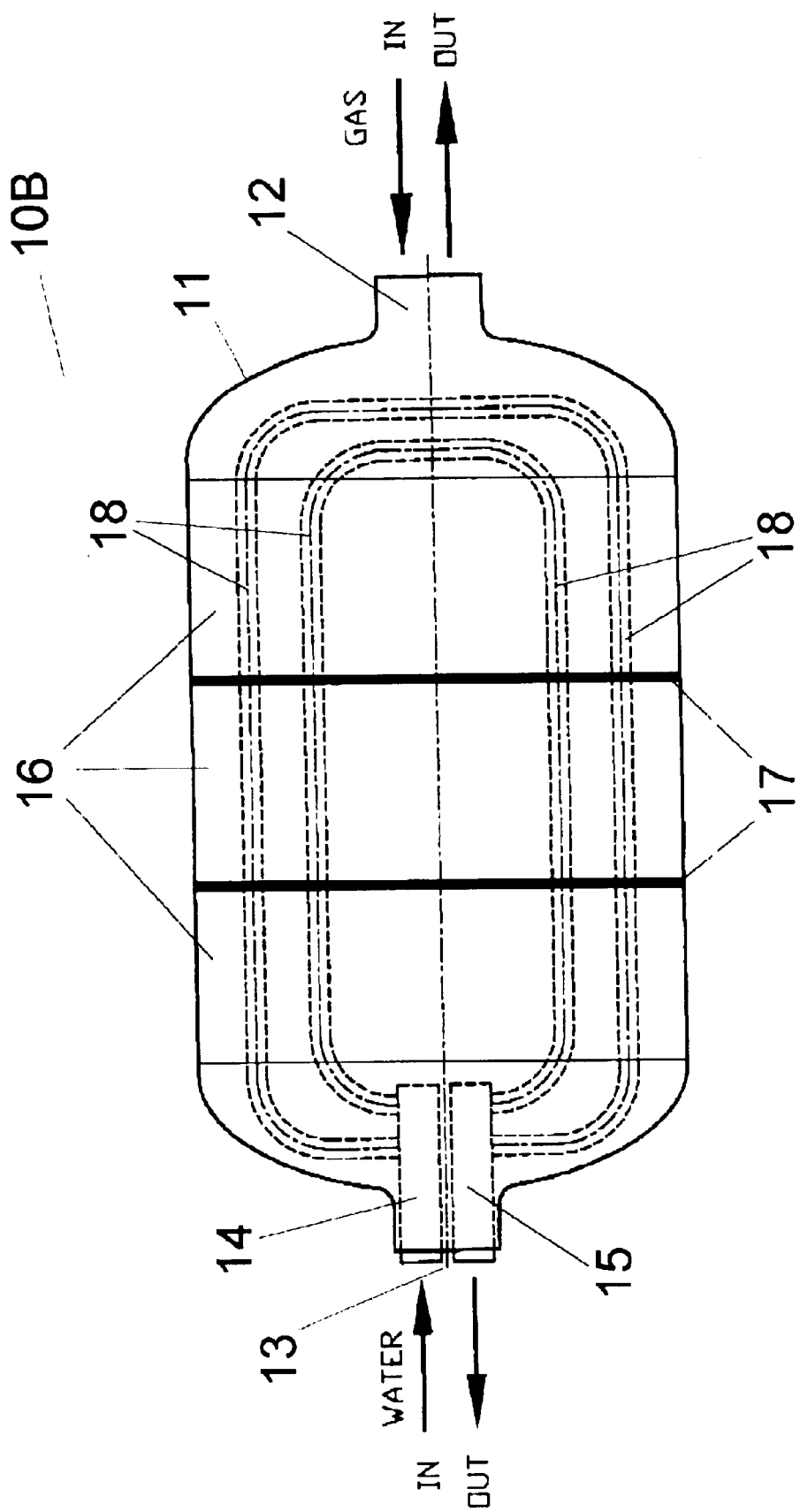
FIG. 2 shows a detailed diagram of the second embodiment of the present invention.

In the second embodiment 10B, the vessel 11 has an opening at each end. This embodiment is shown in detail in FIG. 2. One opening 12 is used for hydrogen to enter or exit the vessel and the opposite opening 13 is used for a heat exchanger fluid to simultaneously enter and exit the vessel. When the heat exchanger fluid enters the vessel, the fluid flows into a manifold 14 which distributes the fluid to a plurality of heat exchanger tubes 18 within the vessel. After the fluid flows through the vessel via the heat exchanger tubes 18, the fluid flows into another manifold 15 which combines the streams into a single exit stream which flows out of the vessel 11.

Figure 3:
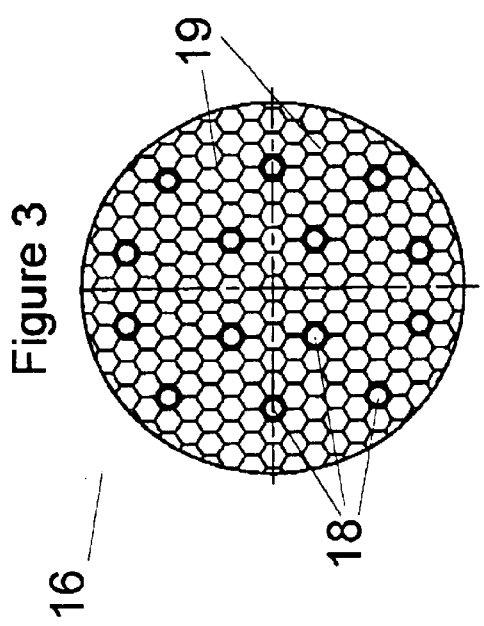
FIG. 3 shows a cross sectional view of the honeycomb configuration of the blocks in accordance with the present invention.

FIG. 3 shows a cross-sectional view of the cells 19 as disposed in accordance with the present invention. The cells are positioned parallel to the horizontal axis of the vessel 11. The cells 19 are adjacent to one another forming one or more blocks 16 having a honeycomb configuration where most of the walls of the cells are shared throughout each block 16. The cells 19 forming each honeycomb block 16 generally have a wall and an opening at each end. The cells may have uniform heights and diameters, however, cells having differing heights and diameters may be used in accordance with the present invention provided the blocks are adjacently disposed throughout the vessel. Each individual cell may have a circular or polygonal horizontal cross sectional shape, as long as all the compartments throughout the blocks 16 are adjacent to each other. Other cell configurations may also be used in accordance with the present invention. FIGS. 4a, 4c, 4d, and 4e show a few examples of different polygonal cell designs that may be used in accordance with the present invention. The cells 19 may have a diameter up to 25 mm, however, the diameter of the cells is preferably 3 mm and 12 mm, most preferably between 3 mm and 7 mm. The cells 19 may be composed of Al, Mg, Cu, or another thermally conductive material as long as the material has a negligible reaction with the hydrogen storage material and hydrogen.

Figure 4E:
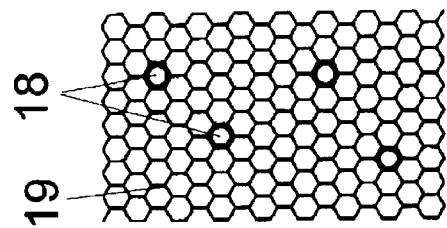
FIGS. 4a–4e show alternate honeycomb configurations of the blocks in accordance with the present invention.
Figure 4D:
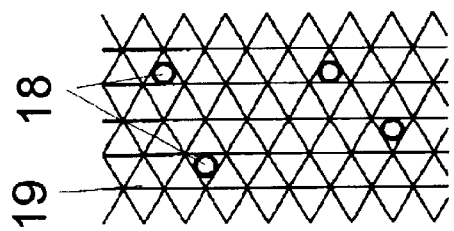
Figure 4C:
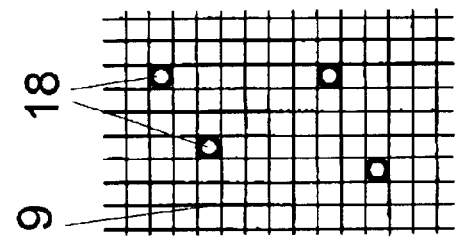
Figure 4B:
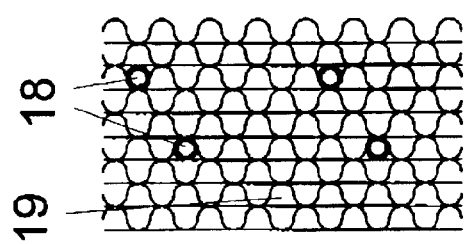
Figure 4A:
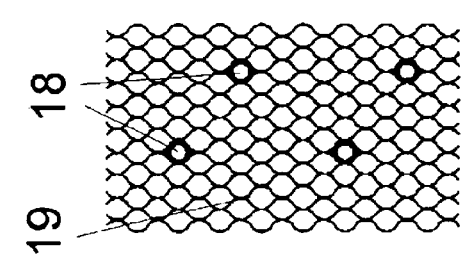

The hydrogen storage material may also be stored in blocks comprised of a corrugated material rather than cells. An example of a corrugated material is shown in FIG. 4b. The corrugated material may be composed of Al, Mg, Cu, or another thermally conductive material as long as the material has a negligible reaction with the hydrogen storage material and hydrogen. The corrugated material is well known in the art and is used in a variety of heat exchangers.

One or more honeycomb configured blocks 16 may be placed within the vessel 11 to compartmentalize the interior into a honeycomb configuration. Where more than one honeycomb block 16 is used, the honeycomb blocks are positioned back to back throughout the entire vessel 11 thereby compartmentalizing the entire interior of the vessel. The honeycomb blocks may be separated by spaces 17 thus creating flow channels through which hydrogen can better contact the hydrogen storage material. Each block 16 is preferably in thermal contact with the inside wall of the vessel 11 to promote thermal conductivity within the vessel. The blocks 16 may have differing widths and diameters to better conform to the interior of the vessel, however, the cells forming each block preferably have equal diameters.

Heat exchanger tubing 18 is inserted through the honeycomb blocks 16 to control the temperature throughout the vessel 11. The heat exchanger tubing 18 is inserted through each block 16 via the cells 19 throughout the entire length of the vessel 11. In the preferred embodiment, a plurality of U shaped tubes are used. The cells 19 are configured to conform to the shape of the heat exchanger tubing 18 once the heat exchanger tubing is inserted through the cells 19 thereby assuring thermal contact between the heat exchanger tubing and the cells. Thermally conductive grease or oil may be placed on the outside of the heat exchanger tubing 18 to aid in insertion of the heat exchanger tubing 18 through the cells 19 and aid in heat transfer between the cells and the heat exchanger tubing. The amount of heat exchanger tubing 18 within the vessel 11 is variant upon the amount of heat required to be added or removed from the vessel. The heat exchanger tubing 18 transports a cooling/heating liquid through the tubes to remove excess heat to the outside environment during hydrogenation of the hydrogen storage material or add heat to the hydrogen storage material during dehydrogenation. The cooling/heating liquid is preferably either ethylene glycol, water, or a mixture thereof, however, other liquids or gases may be used in accordance with the present invention. The heat exchanger tubing 18 may be composed of stainless steel or aluminum. Other materials may be substituted provided they have negligible reactivity within the system.

Figure 5:
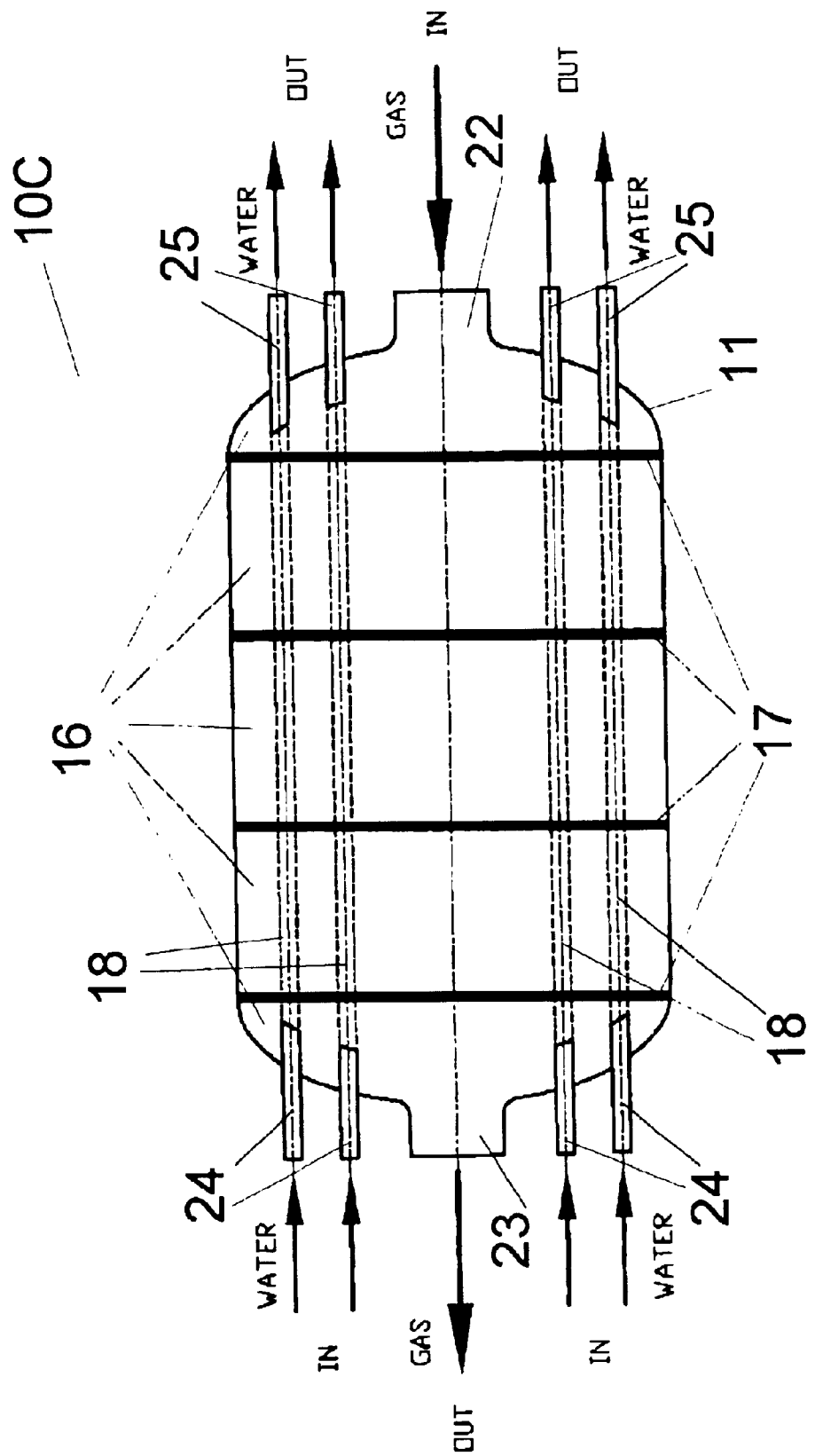
FIG. 5 shows a detailed diagram of the third embodiment of the present invention.

In a third embodiment 10C shown in FIG. 5, the hydrogen enters through a restrictive neck at one end 22 of the vessel 11 and exits at the opposite end 23 through another restrictive neck. In this embodiment, the heat exchanger tubes 18 are inserted through the vessel rather than being contained inside the vessel. The heat exchanger tubing is inserted through the cells as in the preferred embodiment. However, due to this design, the entire interior of the vessel is capable of being compartmentalized unlike the second embodiment where interior space must be allotted for the manifolds and the U shaped heat exchanger tubes. The heat exchanger fluid flows into one end 24 of the vessel and exits at the opposite end 25. This embodiment is designed for use at lower pressures due to the multiple openings in the vessel.

The vessel is preferably constructed from a container having a cylindrical shape, however, vessels having different shapes may be used in accordance with the present invention. To construct the present invention, one or more honeycomb blocks are required. The honeycomb blocks are preferably the same size, however, blocks with differing sizes may be used to better compartmentalize the entire interior of the vessel. Smaller honeycomb blocks are used to optimize the compartmentalization within the vessel. Heat exchanger tubing is inserted through the cells disposed within the honeycomb blocks. The honeycomb blocks are thereby positioned back to back with heat exchanger tubing extending throughout the series of honeycomb blocks. As the heat exchanger tubing is inserted through the cells, the cells conform to the shape of the tubing assuring thermal contact between the cells and the tubing. The cells and the tubing together form the honeycomb hydrogen storage structure. Once the honeycomb hydrogen storage structure has been assembled, it is placed into a pressure containment vessel.

The vessel may be formed having a restrictive neck on one or both ends. The restrictive neck is preferably formed using a spinning process. Prior to the spinning process, the honeycomb hydrogen storage structure is placed inside a cylindrical structure having at least one open end. The cylindrical structure is then placed on a spindle with the open end facing up. A spinning roller is then placed in frictional contact with the edge of the open end. The open end is heated and the spindle begins spinning the cylindrical structure. The spinning roller applies force to the open end of the cylindrical structure and the open end deforms to form a restrictive neck. Resulting is a seamless pressure containment vessel having a restrictive neck. Alternatively, the cylindrical structure may be heated and depressed in a mold to form a pressure containment vessel having a restrictive neck. Once the restrictive necks on the honeycomb hydrogen storage structure are formed, the vessel is allowed to cool and a hydrogen storage material is poured into an opening at one of the ends of the vessel. Due to the positioning of the cells with respect to each other, the hydrogen storage material filters through the cells until all of the cells are filled. Valves are then inserted into the restrictive necks and the vessel is sealed.

The hydrogen storage alloy may include a variety of metallic materials for hydrogen-storage, e.g., Mg, Mg—Ni, Mg—Cu, Ti—Fe, Ti—Ni, Mm—Co, Ti—Mn, La—Ni, Rare Earth-Nickel, and Mm—Ni alloy systems (wherein, Mm is Misch metal, which is a rare-earth metal or combination/alloy of rare-earth metals).

Of these materials, the Mg alloy systems can store relatively large amounts of hydrogen per unit weight of the storage material. However, heat energy must be supplied to release the hydrogen stored in the alloy, because of its low hydrogen dissociation equilibrium pressure at room temperature. Moreover, release of hydrogen can be made, only at a high temperature of over 250° C. along with the consumption of large amounts of energy.

The rare-earth (Misch metal) alloys have their own problems. Although they typically can efficiently absorb and release hydrogen at room temperature, based on the fact that it has a hydrogen dissociation equilibrium pressure on the order of several atmospheres at room temperature, their hydrogen-storage capacity per unit weight is lower than any other hydrogen-storage material and they are very expensive.

The Ti—Fe alloy system, which has been considered as a typical and superior material of the titanium alloy systems, has the advantages that it is relatively inexpensive and the hydrogen dissociation equilibrium pressure of hydrogen is several atmospheres at room temperature. However, since it requires a high temperature of about 350° C. and a high pressure of over 30 atmospheres for initial hydrogenation, the alloy system provides relatively low hydrogen absorption/desorption rate. Also, it has a hysteresis problem which hinders the complete release of hydrogen stored therein.

The Ti—Mn alloy has excellent room temperature kinetics and plateau pressures. The Ti—Mn alloy system has been reported to have a high hydrogen-storage efficiency and a proper hydrogen dissociation equilibrium pressure, since it has a high affinity for hydrogen and low atomic weight to allow large amounts of hydrogen-storage per unit weight.

A generic formula for the Ti—Mn alloy is: $Ti_{Q-X}Zr_XMn_{Z-Y}A_Y$, where A is generally one or more of V, Cr, Fe, Ni and Al. Most preferably A is one or more of V, Cr, and Fe. The subscript Q is preferably between 0.9 and 1.1, and most preferably Q is 1.0. The subscript X is between 0.0 and 0.35, more preferably X is between 0.1 and 0.2, and most preferably X is between 0.1 and 0.15. The subscript Y is preferably between 0.3 and 1.8, more preferably Y is between 0.6 and 1.2, and most preferably Y is between 0.6 and 1.0. The subscript Z is preferably between 1.8 and 2.1, and most preferably Z is between 1.8 and 2.0. The alloys are generally single phase materials, exhibiting a hexagonal $C_{14}$ Laves phase crystalline structure.

The foregoing is provided for purposes of explaining and disclosing preferred embodiments of the present invention. Modifications and adaptations to the described embodiments, particularly involving changes to the shape of the vessel, the type of hydrogen storage alloy, the shape and design of the compartments within the storage vessel, and the shape and design of the heat exchanger tubing will be apparent to those skilled in the art. These changes and others may be made without departing from the scope or spirit of the invention in the following claims.

What is claimed is:

1. A process for constructing a compartmentalized hydrogen storage vessel comprising the steps of:

a) placing at least one block comprising a plurality of cells having a cell wall, an opera top, and an open bottom arranged in a honeycomb configuration inside a metallic cylindrical structure having at least one opening;

b) inserting at least one heat exchanger tube adapted to thermally treat said interior volume of said vessel through said at least one block honeycomb;

c) forming a restrictive neck from said at least one opening using a spinning process; and d) filling at least one of said plurality of cells with a hydrogen storage alloy.

2. The process according to claim 1, wherein said cells are configured to conform to the shape of said heat exchanger tubes once said that exchanger tubes are inserted through said cells.

3. The process according to claim 1, wherein said blocks are comprised of a corrugated material.

4. The process according to claim 1 further comprising the step of:

e) wrapping said metal cylindrical structure in a fiber reinforced composite material.

* * * * *